UNITED STATES PATENT OFFICE.

FRANKLIN BAKER, JR., OF PHILADELPHIA, PENNSYLVANIA.

PROCESS OF PREPARING OR TREATING COCOANUT.

1,230,365.

Specification of Letters Patent. Patented June 19, 1917.

No Drawing. Application filed June 17, 1916. Serial No. 104,210.

*To all whom it may concern:*

Be it known that I, FRANKLIN BAKER, Jr., a citizen of the United States, residing in Philadelphia, Pennsylvania, have invented an Improved Process of Preparing or Treating Cocoanut, of which the following is a specification.

My invention relates to the preparation, preservation and packing of fresh cocoanut; that is to say, the meat or kernel of the fruit whereby it will keep in a natural moist and fresh state for a relatively indefinite length of time. My improved preserved product will have the same degree of moisture that is possessed by the green fruit, and is available for use for the same purposes that the fresh green cocoanut is employed.

The essential object of my invention is to provide a preserved cocoanut product with nothing added; such preserved product having the original moisture and condition of fresh cocoanut, and the whole being shredded or grated and packed in cans, glasses or other suitable form of receptacles which are hermetically sealed.

In carrying my process into effect, the kernel or meat of the cocoanut, after removal of the milk, is shredded or grated by any approved or well known means, and is then placed in the cans or other receptacles in which it is packed for sale and subsequent use. The cans or other receptacles in an open condition are then placed in a retort or steam chest into which steam is introduced and maintained under pressure; the open cans permitting the superheated steam to thoroughly permeate the cocoanut, and the temperature at which this treatment takes place being sufficient to kill any bacteria present in the cocoanut. This temperature will vary, depending upon certain factors. In my work I have found that a temperature at or slightly in excess of 212° F. may be sufficient under some conditions. Generally speaking and for the meat of most cocoanuts, the temperature may range from 215° F. to 225° F.; the temperature usually employed being about 220° F., although it is possible to raise the temperature to 250° F., without injury to the cocoanut. The open cans with the contained cocoanut are maintained at the desired temperature until the cocoanut has been thoroughly heated through and the bacteria thereof destroyed. The usual period of time for this heat treatment of the open cans is approximately one-half hour, and in some instances it may be necessary or desirable to raise the temperature in the steam pressure chamber to the higher point, approximately 250° F., for a short period of time, and this may be necessary when treating some kinds of cocoanut in which the bacteria present can only be destroyed at the higher temperature. This higher temperature may be maintained for approximately five minutes, and may be included in the total time allowed for heat treating the open cans.

The cans or other receptacles are then withdrawn from the pressure chamber and capped and hermetically sealed under sterile conditions, and then they may be again subjected to a sterilizing temperature which, for the desired purpose, may range as high as 250° F., to kill any germs which may have developed between the treatment of the cocoanut in the open cans and the capping and sealing operation. After this the cans or receptacles are slowly cooled and they are then ready for market and subsequent use.

It will be understood, of course, that the bacterial content of the meat or kernel of the cocoanut varies within certain limits. In the treatment of cocoanut for the purpose of preserving the same therefore, while all of the bacterial content of certain cocoanuts may be killed at the lower temperatures, others may require the higher temperatures.

In all instances, the high temperature treatment is preferably for a shorter length of time than the treatment at the lower temperature, and such high temperature treatment follows treatment at the lower temperatures, so that the material can be raised to the higher temperature in a relatively short period of time. In carrying out my improved method of procedure in the treatment of cocoanut, no harm to the product will result in the operation of destroying the bacteria that may be present.

The finished product, when used at any time after packing in the hermetically sealed receptacles, will be found to be as fresh and moist as the shredded or grated cocoanut prepared directly from the fresh green kernel, and it may be used for all purposes for which the fresh green kernel is employed.

Reference in the claims to the step of cutting, grating, or shredding the cocoanut kernel is not to be construed as limiting my invention to any exact manner of preparing the kernel; such language being intended to include any method or means of finely dividing the kernel to make it readily available in carrying out my improved process and for subsequent use as an article of food.

I claim:

1. The process of preserving cocoanut in a natural moist condition, which consists in cutting, grating, or shredding the kernel, packing the same in suitable receptacles, subjecting the open receptacles to steam under pressure and at a temperature approximating 220° F., to destroy bacteria present in the cocoanut, hermetically sealing said receptacles, and then subjecting said sealed receptacles for a short period of time to a sterilizing temperature not exceeding 250° F.

2. The process of preserving cocoanut in a natural moist condition, which consists in cutting, grating or shredding the kernel, packing the same in suitable receptacles, subjecting the open receptacles to steam under pressure at a temperature not exceeding 250° F. to destroy bacteria present in the cocoanut, hermetically sealing said receptacles and maintaining them under sterilizing conditions, and then subjecting said sealed receptacles for a short period of time to a temperature not exceeding 250° F.

FRANKLIN BAKER, Jr.